United States Patent
Shin et al.

(10) Patent No.: US 9,740,370 B2
(45) Date of Patent: Aug. 22, 2017

(54) PRINTING CONTROL METHOD, AND APPARATUS AND COMPUTER-READABLE RECORDING MEDIUM THEREOF

(71) Applicant: Samsung Electronics Co., Ltd, Suwon-si Gyeonggi-do (KR)

(72) Inventors: Woo-chul Shin, Osan-si (KR); Seung-wan Lee, Suwon-si (KR); Jun-young Choi, Suwon-si (KR); Hee-jung Kim, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 390 days.

(21) Appl. No.: 14/454,860

(22) Filed: Aug. 8, 2014

(65) Prior Publication Data

US 2015/0052480 A1 Feb. 19, 2015

(30) Foreign Application Priority Data

Aug. 14, 2013 (KR) ......................... 10-2013-0096506

(51) Int. Cl.
*G06F 3/048* (2013.01)
*G06F 3/0482* (2013.01)
*G06F 3/12* (2006.01)
*G06F 3/0484* (2013.01)

(52) U.S. Cl.
CPC .......... *G06F 3/0482* (2013.01); *G06F 3/0484* (2013.01); *G06F 3/1205* (2013.01); *G06F 3/1208* (2013.01); *G06F 3/1255* (2013.01); *G06F 3/1257* (2013.01); *G06F 3/1285* (2013.01)

(58) Field of Classification Search
CPC combination set(s) only.
See application file for complete search history.

(56) References Cited

U.S. PATENT DOCUMENTS 6,642,943 B1 * 11/2003 Machida ............ H04N 1/00408
358/1.15
2005/0286950 A1 * 12/2005 Kim ...................... G06F 3/1204
400/76

(Continued)

FOREIGN PATENT DOCUMENTS

EP 2 161 913 3/2010
JP 2003-316538 11/2003

(Continued)

OTHER PUBLICATIONS

European Search Report dated May 4, 2017 from European Patent Application No. 14153496.6, 7 pages.

*Primary Examiner* — Hien Duong
(74) *Attorney, Agent, or Firm* — Staas & Halsey LLP

(57) ABSTRACT

A printing control apparatus includes a user interface configured to receive a selection of a printing option to be applied to a document, and to display, in response to a favorite printing option being the selection of the printing option, information about a method for a preselected printing option, a printer driver configured to establish the printing option to be applied to the document according to the information about the method, and to generate printing data according to the printing option, and a communication interface configured to transmit the printing data to an image forming apparatus.

18 Claims, 17 Drawing Sheets

(56) References Cited

U.S. PATENT DOCUMENTS

| | | | |
|---|---|---|---|
| 2006/0221372 A1* | 10/2006 | Onishi | G06F 3/1204 358/1.13 |
| 2006/0279759 A1* | 12/2006 | Choi | G06F 3/1205 358/1.13 |
| 2009/0268241 A1* | 10/2009 | Choi | G06F 3/1204 358/1.15 |
| 2009/0310171 A1 | 12/2009 | Onoda | |
| 2010/0053668 A1* | 3/2010 | Huh | H04N 1/00408 358/1.15 |
| 2011/0134464 A1* | 6/2011 | Chae | G06F 3/1205 358/1.15 |
| 2011/0179961 A1* | 7/2011 | Yanagawa | G06F 3/1208 101/483 |
| 2011/0317193 A1* | 12/2011 | Iwase | G03G 15/234 358/1.13 |
| 2012/0030585 A1* | 2/2012 | Akuzawa | G06F 3/0481 715/747 |
| 2012/0236361 A1 | 9/2012 | Takei et al. | |
| 2013/0033725 A1* | 2/2013 | Tarumi | G06F 3/1205 358/1.15 |
| 2013/0188222 A1* | 7/2013 | Sakuraba | G06F 3/1296 358/1.15 |
| 2014/0055799 A1* | 2/2014 | Nakagawa | G06K 15/1803 358/1.13 |

FOREIGN PATENT DOCUMENTS

| | | |
|---|---|---|
| KR | 10-2004-0051987 | 6/2004 |
| KR | 10-2007-0047079 | 5/2007 |

* cited by examiner

FIG. 3

| NAME | TYPE | DATA |
|---|---|---|
| (BASIC VALUES) | REG_SZ | (NOT VALID) |
| ColorMode | REG_DWORD | 0x00000000 (0) |
| Duplex | REG_DWORD | 0x00000002 (2) |
| PaperType | REG_DWORD | 0x0000012e (302) |
| Watermark | REG_DWORD | 0x00000004 (4) |
| Watermark_Message | REG_SZ | CONFIDENTIAL |
| m_bDefaultSet | REG_DWORD | 0x00000000 (0) |
| m_bNewMode | REG_DWORD | 0x00000001 (1) |

☐ Favorite
├─ ☐ Favorite1
├─ ☐ Favorite2
├─ ☐ Favorite3
├─ ☐ Favorite4
└─ ☐ Favorite5

[Favorite1]
ColorMode = 0
Duplex = 2
PaperType = 302
WaterMark = 4
waterMark_Message = CONFIDENTIAL
m_bDefaultSet = 0
m_bNewMode = 1

[Favorite2]
...

[Favorite3]
...

PRINTING CONTROL METHOD, AND APPARATUS AND COMPUTER-READABLE RECORDING MEDIUM THEREOF

CROSS-REFERENCE TO RELATED APPLICATIONS

This application claims the benefit of priority to Korean Patent Application No. 10-2013-0096506, filed on Aug. 14, 2013, in the Korean Intellectual Property Office, the content of which is incorporated herein in its entirety by reference.

BACKGROUND OF THE INVENTION

1. Field of the Invention

Embodiments of the present inventive concept relate to a printing control method, and an apparatus and computer-readable recording medium thereof, and more specifically, to a printing control method in which a user may easily recognize whether a printing option previously established by a user is applied or not when selecting a favorite printing option, and a printing control apparatus and a computer-readable recording medium thereof.

2. Description of the Related Art

When a user tries to print documents, prepared using computer application programs, using an image forming apparatus such as a printer or a multi-function peripheral (MFP), a printing control apparatus, such as a computer, should install a printer driver provided from manufacturers of the image forming apparatus in order to control printing functions of the image forming apparatus.

The printer driver provides a user interface (UI) to facilitate selecting printing options to be applied to printed documents. Via the UI, a user may select printing options with respect to various printing option items (e.g., paper size, paper type, paper cassette, dual printing, stapler, offset, overlay, watermark, and/or N-Up printing (to print plural pages onto one sheet of paper)) that may be applied to printed documents.

Currently available printer drivers provide a favorite printing option so that a user can conveniently select a printing option. Herein, the favorite printing option is a function that allows a user to select a frequently used function or printing option (or a plurality of functions or printing options) with selecting single selection. Thus, a user can select a collection of one or more printing options that he wants by selecting a single favorite printing option.

However, one print driver may implement the favorite printing option in a manner different from that of another print driver so that when a user selects the favorite printing option, he may have a problem in that printing is not performed as he intended. For example, when the favorite printing option is selected in certain printer drivers, the previously selected printing option may be initialized. In another example, when a user selects the favorite printing option (e.g., dual printing) after having selected another printing option (e.g., black and white printing), the other printing option (e.g., black and white printing) is undone and the favorite printing option (e.g., dual printing) may only be applied. Alternatively, in other print drivers, even when the favorite printing option is selected, the previously selected printing option may continue to be applied.

Because whether or not the previously selected printing option is applied is different depending on the system used when selecting the favorite printing option, if he does not recognize such a difference, a user may have the documents printed in a way he does not intend.

SUMMARY OF THE INVENTION

Exemplary embodiments of the present inventive concept may overcome the disadvantages described above and other disadvantages not described above. Furthermore, the present inventive concept is not required to overcome the disadvantages described above, and an exemplary embodiment of the present inventive concept may not overcome any of the problems described above.

The present inventive concept provides a printing control method in which a user may easily recognize whether a printing option preset by a user is applied or not when selecting a favorite printing option, and a printing control apparatus and a computer-readable recording medium thereof.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a printing control method of a printing control apparatus configured to connect to an image forming apparatus. The method may include receiving, at the printing control apparatus, a selection of a printing option to be applied to a document, in response to a favorite printing option being the selection of the printing option, displaying, at the printing control apparatus, information about a method for a preselected printing option, establishing, at the printing control apparatus, the printing option to be applied to the document according to the displayed information about the method, and generating, at the printing control apparatus, printing data according to the established printing option and transmitting the printing data to the image forming apparatus.

The printing control method may additionally include selecting, at the printing control apparatus, the method for the preselected printing option.

The selecting the method may select whether to keep or to undo a setting of the preselected printing option.

The preselected printing option may be a plurality of preselected printing options and the selecting the method may select whether to keep or to undo the setting of each of the preselected printing options.

The printing control method may additionally include determining, at the printing control apparatus, an existence of a capability to set the preselected printing option and the favorite printing option simultaneously. In response to the existence of the capability, the selecting the method may include receiving a selection of the method for the preselected printing option through a user interface window.

The printing control method may additionally include, in response to a lack of the existence of the capability, displaying, at the printing control apparatus, information that the preselected printing option is not set.

The receiving the selection of the printing option may include receiving the selection of the printing option through a user interface window which may include a first area configured to receive a selection of the preselected printing option and a second area configured to receive a selection of the favorite printing option.

The user interface window may include a third area configured to receive a selection of the method for the preselected printing option.

The printing control method may additionally include storing, at the printing control apparatus, the established printing option as the favorite printing option.

The storing may include storing a difference between basic setting values for the image forming apparatus and setting values for the established printing option.

The storing may include storing, in response to the favorite printing option being the selection of the printing option, the information about the method for the preselected printing option together with information about the favorite printing option.

The foregoing and/or other features and utilities of the present general inventive concept also provide a printing control apparatus connectable to an image forming apparatus. The printing control apparatus may include a user interface configured to receive a selection of a printing option to be applied to a document, and to display, in response to a favorite printing option being the selection of the printing option, information about a method for a preselected printing option, a printer driver configured to establish the printing option to be applied to the document according to the information about the method, and to generate printing data according to the printing option established by the print driver, and a communication interface configured to transmit the printing data to the image forming apparatus.

The printer driver may additionally be configured to select the method of the preselected printing option.

The selection of the method may determine whether to keep or to undo a setting of the preselected printing option.

The printer driver may additionally be configured to determine an existence of a capability to set the preselected printing option and the favorite printing option simultaneously, and the user interface may additionally be configured to receive, in response to the existence of the capability, a selection of the method for the preselected printing option.

The preselected printing option may be a plurality of preselected printing options and the selection of the method may determine whether to keep or to undo the setting of each of the preselected printing options.

The user interface may additionally be configured to display, in response to a lack of the existence of the capability, information that the preselected printing option is not set.

The user interface may additionally be configured to receive the selection of the printing option through a user interface window which may include a first area configured to receive a selection of the preselected printing option and a second area configured to receive a selection of the favorite printing option.

The user interface window may include a third area configured to receive a selection of the method for the preselected printing option.

The printing control apparatus may additionally include a storage configured to store the printing option established by the print driver as the favorite printing option.

The storage may additionally be configured to store a difference between basic setting values for the image forming apparatus and setting values for the printing option established by the print driver.

The storage may additionally be configured to store, in response to the favorite printing option being the selection of the printing option, the information about the method for the preselected printing option together with information about the favorite printing option.

The foregoing and/or other features and utilities of the present inventive concept also provide a non-transitory computer-readable recording medium that includes programs to implement a printing control method, in which the printing control method may include receiving, at a controller, a selection of a printing option to be applied to a document, displaying, under a control of the controller, in response to a favorite printing option being the selection of the printing option, information about a method for the preselected printing option, establishing, at the controller, the printing option to be applied to the document according to the displayed information about the method, and generating, at the controller, printing data according to the established printing option.

The foregoing and/or other features and utilities of the present inventive concept also provide a printing control apparatus that includes a user interface configured to receive a selection of a printing option and to display information relevant to the selection of the printing option, a print driver configured to establish the printing option according to the information, and a storage configured to store a difference between basic setting values for an image forming apparatus and setting values for the printing option established by the print driver.

The user interface may include a user interface window configured to receive, at a first area, a selection of a preselected printing option and, at a second area, a selection of a favorite printing option.

The favorite printing option may combine a printing option for a first category of printing options with a printing option for a second category of printing options, wherein the first category of printing options is one of a size of paper, a size of envelope, a number of copies, an orientation of paper, a number of sides of paper on which to print, a quality of printing, a color of printing, a template for a document to be printed, and an addition of an indication of a security level on the document to be printed.

The information relevant to the selection of the printing option may include at least one of information about a status of the preselected printing option, information about maintaining the status of the preselected printing option, information about having the input printing option and the preselected printing option simultaneously set, information about setting the input printing option, and information about a printing option within a category of printing options that is incompatible with the input printing option.

The foregoing and/or other features and utilities of the present inventive concept also provide a printing control apparatus that includes a user interface configured to receive a selection of a printing option and to display, in response to an input printing option for the selection, information relevant to the selection including information about maintaining a status of a preselected printing option, information about having the input printing option and the preselected printing option simultaneously set, and information about a printing option within a category of printing options that is incompatible with the input printing option, and a print driver configured to establish the printing option according to the information.

The foregoing and/or other features and utilities of the present inventive concept also provide a printing control apparatus that includes a user interface including a user interface window configured to receive, at a first area, a selection of a preselected printing option and, at a second area, a selection of a favorite printing option, wherein the favorite printing option combines a printing option for a first category of printing options with a printing option for a second category of printing options, and a print driver configured to establish at least one of the preselected printing option and the favorite printing option.

The print driver may additionally be configured to determine an existence of a capability to set the preselected printing option and the favorite printing option simultaneously.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 2 and 3 are diagrams that illustrate information about a favorite printing option stored in a storage illustrated in FIG. 1;

DETAILED DESCRIPTION OF THE EMBODIMENTS

Figure 1:
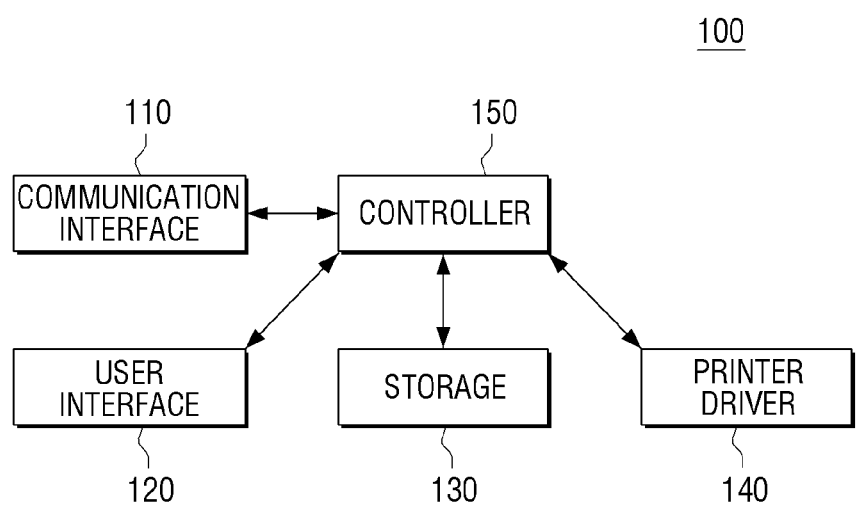
FIG. 1 is a block diagram of a printing control apparatus according to an embodiment of the present inventive concept.

Reference will now be made in detail to the embodiments of the present general inventive concept, examples of which are illustrated in the accompanying drawings, wherein like reference numerals refer to like elements throughout. The embodiments are described below in order to explain the present general inventive concept while referring to the figures.

The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the present inventive concept with unnecessary detail.

FIG. 1 is a block diagram of a printing control apparatus according to an embodiment of the present inventive concept.

Referring to FIG. 1, the printing control apparatus 100 may include a communication interface 110, a user interface 120, a storage 130, a printer driver 140 and a controller 150. Herein, the printing control apparatus 100 may include a laptop computer, a personal digital assistant (PDA), a portable media player (PMP), a cellular phone as well as a personal computer that can perform printing by using the printer driver 140.

The communication interface 110 may be formed to connect the printing control apparatus 100 to an external device (not illustrated) via wireless communication technology (e.g., Global System for Mobile Communications (GSM), Universal Mobile Telecommunications System (UMTS), Long Term Evolution (LTE), and/or Wireless Broadband (WiBRO)) as well as a local area network (LAN) and an internet network.

Further, the communication interface 110 may transmit printing data to an image forming apparatus (not illustrated). For example, the communication interface 110 may transmit the printing data generated in the printer driver 140, which is described below, to the image forming apparatus. When the printing control apparatus 100 can connect a plurality of image forming apparatuses, the generated printing data may be transmitted to the image forming apparatus selected by a user. Herein, the printing data may be data written in a printing language such as, for example, Printer Command Language (PCL) and PostScript (PS) that the image forming apparatus can recognize. Alternatively, when the image forming apparatus supports direct printing, the printing data may be files in themselves such as files that may be formatted as, for example, Portable Document Format (PDF), Open Extensible Markup Language (XML) Paper Specification (XPS), and Joint Photographic Experts Group (JPG).

The user interface 120 may include a plurality of function keys with which a user can establish or select a plurality of functions supported by the printing control apparatus 100, and may display a plurality of information provided from the printing control apparatus 100. The user interface 120 may be implemented to be a device configured to receive an input and simultaneously to produce an output such as, for example, a touch screen or a device combined with a mouse and a monitor.

The user interface 120 may receive documents in which a printing job may be performed. For example, the user interface 120 may implement applications that create or edit documents or images and may receive documents or images in which a printing job may be performed on the applications. Although in the description above a document may be selected after an application is selected, alternatively, an application that corresponds to the document may be selected by selecting the document when the application is implemented.

The user interface 120 may receive a printing command for the selected document. For example, the user interface 120 may receive a printing command for a document that corresponds to an application to create and edit the selected document. Such a printing command may be a printing command for a specific image forming apparatus. In this case, an operation to select the image forming apparatus, which is described below, may be omitted. Although in a description above a printing job may be performed after the document is loaded on the application, alternatively, a printing job may be directly performed without starting the application.

The user interface 120 may receive a selection of the image forming apparatus to perform a printing job for the selected document. For example, when the printing control apparatus 100 is connected with a plurality of image forming apparatuses, the user interface 120 may display a list of the plurality of image forming apparatuses that may perform the printing job, and may receive a selection from the displayed list of the image forming apparatus to perform the printing job. Although in the description above the image forming apparatus may be selected by itself, alternatively, the image forming apparatus and a printing language that corresponds to the image forming apparatus may be simultaneously selected. Herein, the printing language may be a communication language between a printer (not illustrated) and a computer (not illustrated) that may control the printer with a computer application program such as, for example, PCL and PS. Alternatively, when the print control apparatus 100 is set to a default image forming apparatus, such an operation to select the image forming apparatus may be omitted.

Furthermore, the user interface 120 may receive a selection of a printing option to be applied to the selected document. For example, the user interface 120 may display a user interface window (see FIGS. 4-11) that includes a first area to receive a selection of a printing option and a second area to receive a selection of a favorite printing option. A user may select the printing option to be applied to a corresponding document through the displayed user interface window. The user interface window may additionally include a third area to receive a selection of a method for application of the preselected printing option. Specific format of the user interface window displayed on the user interface 120 is described below with reference to FIG. 4.

The favorite printing option may be a printing option preselected by a user; only one printing option may be selected or a combination of plural printing options may be selected.

The user interface 120 may display the method for application of the preselected printing option before the favorite printing option is selected. For example, when the favorite printing option is selected, the user interface 120 may display the method for application of the preselected printing option before the favorite printing option is selected. For example, if it is determined that the method is a first method, the user interface 120 may display that a setting of the preselected printing option is undone.

The method may be a first method to initialize the preselected printing option (or a new method) and a second method to apply the preselected printing option with the favorite printing option (or a preset method). Although the description above only mentions two methods, another method may be used. For example, the first method may be applied generally while the second method may be applied for specific printing options. Alternatively, the second method may be applied generally while the first method may be applied for specific printing options.

When a plurality of printing options are preselected, the same method may be applied to each of the preselected printing options, or different methods may be applied. When different methods are applied for a plurality of printing options, the methods for each of the preselected plural printing options may be displayed.

The user interface 120 may receive an input for the method for the preselected printing option before the favorite printing option is selected. For example, when the favorite printing option is selected, the user interface 120 may display a plurality of methods for application of the preselected printing option before the favorite printing option is selected, and may receive a selection of one method among a plurality of methods. When there are a plurality of preselected printing options, the user interface 120 may receive an input for a comprehensive method for application of a plurality of printing options or may receive an input for separate methods for application of the plural printing options respectively.

Furthermore, the user interface 120 may receive a command to set the favorite printing option. For example, the user interface 120 may receive a selection of at least one printing option and may receive an input for a command to set the selected printing option as the favorite printing option. Therefore, the selected printing option may be set as the favorite printing option, and the user interface 120 may receive an input for a name that corresponds to the favorite printing option during the process in which the favorite printing option is set. Furthermore, the user interface 120 may set features of the method for application of the corresponding favorite printing option.

Furthermore, the user interface 120 may display an example of an application of the established printing option. For example, the user interface 120 may display an outputted example, in a preview format, in which the selected printing option is applied.

The user interface 120 may display effective printing options that may be selected after selecting the favorite printing option. For example, after the favorite printing option is selected, the user interface 120 may display an icon that informs the user that a certain printing option cannot be set simultaneously with the favorite printing option. The icon may be displayed, for example, at a side of a display that corresponds to the certain printing option if the certain printing option cannot be set with the favorite printing option. For example, if the printer driver 140, which is described below, is a universal driver that may be applied to a plurality of image forming apparatuses, the user interface 120 may display information about the ineffective printing options for the currently selected image forming apparatus among displayed information about the favorite printing options. For example, if a favorite printing option has a feature of color printing, and the currently selected image forming apparatus is a device that can only perform black and white printing, then the user interface 120 may indicate, at a side of a display that corresponds to the favorite printing option, that the favorite printing option is not effective.

The storage 130 may store documents. Furthermore, the storage 130 may store information about the favorite printing option. Herein, information about the favorite printing option may be information about the printing options that a user preselects and prestores, which may include a difference between basic setting values about the image forming apparatus and setting values about the established printing option. For example, when a user selects dual printing and black and white printing on the user interface window to set the printing option and establishes these two printing options as a favorite printing option, the storage 130 may store a name that corresponds to the favorite printing option and information that there is difference between the basic setting values and the setting values for dual printing and black and white printing. Such information may be stored together with information about the method for application of the preselected printing option when the favorite printing option is selected.

For example, the storage 130 may store a plurality of the uniform favorite printing options, or may distinguish and store different favorite printing options per user among a plurality of users.

For example, the storage 130 may be implemented to be an external storage medium, a removable disk that includes a Universal Serial Bus (USB) memory, and/or a web server through a network as well as a storage medium within the printing control apparatus 100.

The printer driver 140 may generate printing data about a document prepared using application programs. For example, when a printing command is received, the printer driver 140 may control the user interface 120 to display the user interface window to receive a selection of the image forming apparatus to perform printing. The printer driver 140 may be a printer driver that operates in a specific type of image forming apparatuses, or may be a universal printer driver that operates in various types of image forming apparatuses.

Furthermore, the printer driver 140 may control the user interface 120 to receive an input for the printing option to be applied to the corresponding document. For example, the printer driver 140 may control the user interface 120 to display the user interface window to receive an input for the printing option. A user may select the printing option and/or the favorite printing option through the displayed user interface window.

For example, when a user selects the favorite printing option through the displayed user interface window, the printer driver 140 may determine whether it is necessary to modify a setting of the preselected printing option. For example, the printer driver 140 may determine whether the printing option is selected before the favorite printing option is selected, and may determine that it is unnecessary to modify the setting of the preselected printing option when the printing option is not selected before the favorite printing option is selected.

When the printing option is selected before the favorite printing option is selected, the printer driver 140 may determine that it is necessary to modify the setting of the preselected printing option. Furthermore, the printer driver 140 may determine whether the setting is modified automatically or passively. For example, the printer driver 140 may determine whether it is automatic modifying or passive modifying by considering whether it is impossible to simultaneously set the preselected printing option and the favorite printing option and whether features of the method for application of the favorite printing option are established or not. For example, when there are plural printing options preselected by a user, the printer driver 140 may determine whether a setting is maintained or undone for each of the plural preselected printing options.

Furthermore, the printer driver 140 may control the user interface 120 to display the determined method. The printer driver 140 may set the printing option to be applied to documents according to the determined method. For example, when the preselected printing option is initialized, the printer driver 140 may control the user interface 120 to display a message that informs the user that the preselected printing option is undone by setting the favorite printing option (or by starting the favorite printing option). During this process, a user may conveniently recognize the printing option established for the corresponding document.

The printer driver 140 may determine that the printing option cannot be simultaneously set with the selected favorite printing option, and control the user interface 120 to display information about the printing option that cannot be simultaneously set with the selected favorite printing option. For example, when a user preselects the printing option, the printer driver 140 may control the user interface 120 to search the printing option that cannot be simultaneously set with the preselected printing option and the favorite printing option, and may display the relevant information.

Alternatively, when a user preselects the favorite printing option, the printer driver 140 may control the user interface 120 to search the printing option that cannot be simultaneously set with the preselected favorite printing option, and may display the relevant information. For example, when a user uses a dual printing option and an A4 printing paper option as the favorite printing option, it may be determined that the printing option related to single printing and paper options except A4 are not simultaneously set.

The printer driver 140 may store the currently established printing option as the favorite printing option. For example, the printer driver 140 may store a difference between basic setting values that correspond to an image forming apparatus and setting values of the established printing option as the favorite printing option. Herein, the printer driver 140 may store features of the method for application of the favorite printing option. The print driver 140 is described in detail below with reference to FIGS. 2 and 3.

The printer driver 140 may generate printing data based on the established printing option. For example, the printer driver 140 may generate printing data about a document based on the established printing option. For example, when the connected image forming apparatus is a device that may perform direct printing in which the printing job may be performed only by transmitting files, the printer driver 140 may transmit information about the printing option to be applied to a document while transmitting the document without separately generating printing data.

The controller 150 may control each unit within the printing control apparatus 100. For example, when a printing request command about a document is inputted through the user interface 120, the controller 150 may control the printer driver 140 and the user interface 120 to display the user interface window to receive a setting of the printing option.

When a user establishes the printing option through the displayed user interface window, the controller 150 may control the user interface 120 to generate printing data according to the established printing option. For example, when a user selects the favorite printing option, the controller 150 may control the user interface 120 to display the method for application of the preselected printing option before the favorite printing option is selected. However, if there is no preselected printing option before the favorite printing option is selected, the operation described above may not be performed.

Furthermore, the controller 150 may control the communication interface 110 to transmit the generated printing data to the corresponding image forming apparatus.

Thus, when the favorite printing option is selected after the printing option is selected, the printing control apparatus 100, according to an embodiment of the present inventive concept, may display the method of the selected printing option before the favorite printing option is selected or may receive a selection of a method from a user. Therefore, a user may establish the printing option as he intends to do.

According to the above embodiments of the present inventive concept, the printing control apparatus 100 may include an image forming apparatus such as, for example, a copy machine, an inkjet printer, a laser beam printer (LBP) and a MFP as well as a personal computer. For example, when the image forming apparatus provides the favorite printing option for the printing option (or copying option), the above described technology may be applied to the image forming apparatus.

Figure 2:
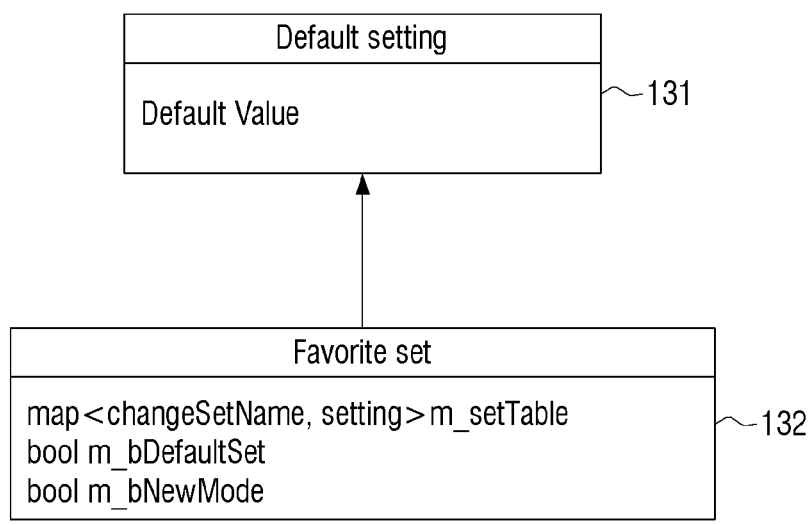

FIGS. 2 and 3 are diagrams that illustrate information about the favorite printing option stored in the storage illustrated in FIG. 1.

When storing the favorite printing option, a conventional printer driver may store all the driver setting values together with the modified setting values for the favorite printing option.

In contrast, according to an embodiment of the present inventive concept, the print driver 140 may store only a difference 132 between basic setting values 131 of the image forming apparatus and setting values of the printing option established by a user. For example, the printer driver 140 may store initial values and options values as data for the printing option. Herein, the initial values may be basic setting values for a specific image forming apparatus, and may be different according to managers or nations/languages. However, the initial values may be standard values that a user may not voluntarily modify. Furthermore, the option values may be values that are modified as compared to the initial values.

Meanwhile, because modifying the driver option may be performed based on the basic initial values, the printer driver 140, according to an embodiment of the present inventive concept, may store only the modified values based on the basic initial values as information about the favorite printing option. For example, storing the favorite printing option only may store the modified values based on the printer basic values for the initial setting values to be stored. A storing format may be a mapping format structure for the modified items and the modified values, and may be stored in a storage medium such as, for example, a register or a local file. By storing according to the process described above, a mode of selection may be provided in which a method of the favorite printing option may be selected by various methods.

For example, it may be implemented that a setting may be applied while maintaining the basic values as in, for example, "m_bNewMode" illustrated in FIG. 2, or that the mode of selection to newly apply and ignore the previous setting values may be created, or that the mode of selection may be applied according to whether the setting is created by a driver such as, for example, "m_bDefaultSet" or by a user.

Such data for the favorite printing option may additionally include whether to be created by a user or features about the method when being selected. When the favorite printing option is selected by confirming the feature values, the method for application of the preselected printing option may be determined.

For example, as illustrated in FIG. 3, when a processing method for the preselected option is established while a color mode, a dual printing setting, a paper type, and a watermark are established, the printer driver 140 may confirm the modified values, may display the corresponding setting as a registration added by a user, and may store the corresponding setting in a storage medium such as, for example, a register or a file.

FIGS. 4 to 11 are views that illustrate the user interface window displayed on the printing control apparatus according to an embodiment of the present inventive concept.

Figure 4:
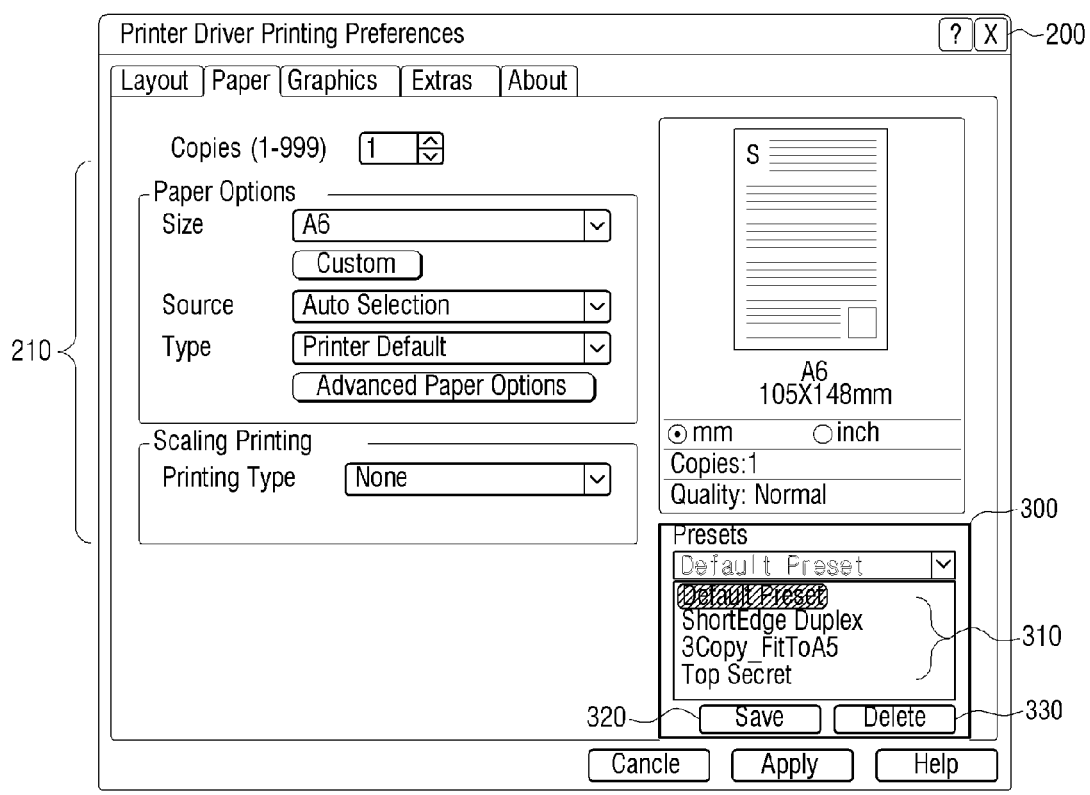
FIGS. 4 to 11 are views that illustrate a user interface window displayed on the printing control apparatus according to an embodiment of the present inventive concept.

FIG. 4 is a view that illustrates an example of the user interface window that receives a setting for the printing option.

Referring to FIG. 4, the user interface window 200 may include a first area 210 to receive a selection of the printing option and a second area 300 to receive a selection of the favorite printing option.

The first area 210 may be an area in which printing option items that may be selected by a user and setting values of each item may be modified for the selected image forming apparatus. FIG. 4 illustrates that a paper option and a copy number option may be established; however, other options may be established in implementations of the present inventive concept.

The second area 300 may be an area in which the favorite printing option may be selected. The second area 300 may include a list area 310 to display a list of the prestored favorite printing options, a storing area 320 to register a new favorite printing option, and a delete area 330 to delete the prestored favorite printing option.

The list area 310 may display the favorite printing option preset by a user. The favorite printing option illustrated in FIG. 4 is explained below.

First, for example, a "ShortEdge duplex" printing option may indicate a printing option to output the outputted materials to be dual-printed based on a short side of the paper. Furthermore, for example, a "3copy_FitToA5" printing option may indicate a combination of two printing options such as an option to use A5 paper for the printing paper and an option to produce three printed copies. Additionally, for example, a "Top Secret" printing option may indicate a printing option to print "Top Secret" on a center of the paper separately from the corresponding material to be printed.

The storing area 320 may be an area in which the favorite printing option is established. When a user selects the printing option at the first area 210 and selects the storing area 320, the user interface window in FIG. 5 or FIG. 6 may be displayed. Further explanation is provided below with reference to FIGS. 5 and 6.

Figure 5:
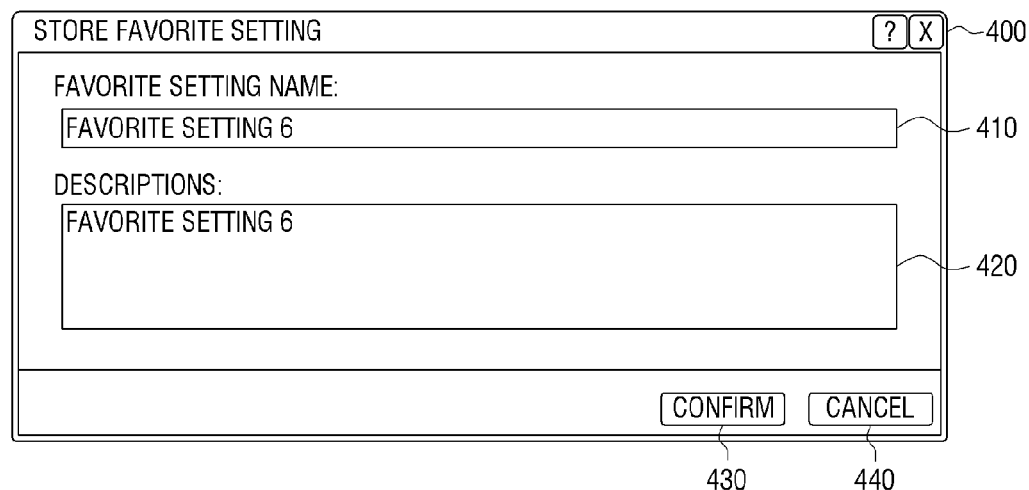
Figure 6:
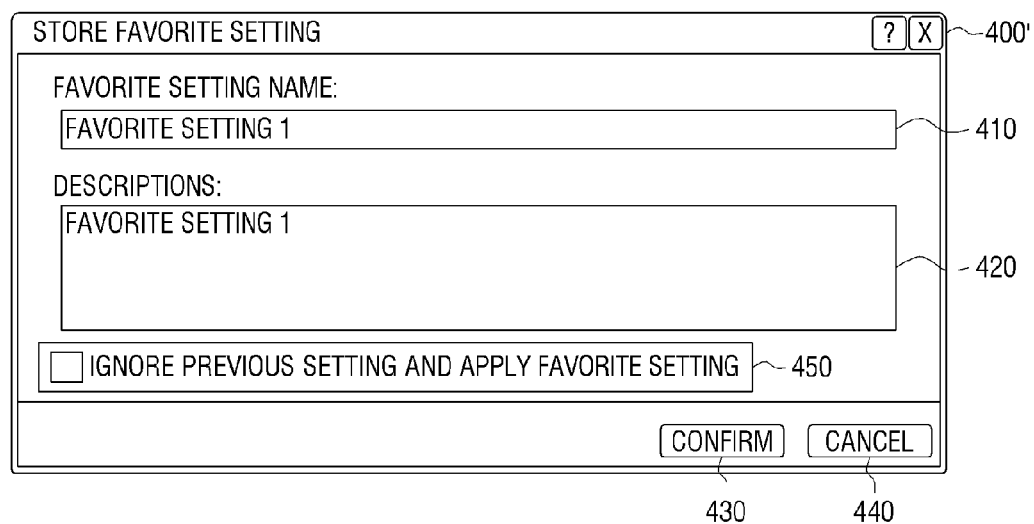

FIGS. 5 and 6 are views that illustrate examples of the user interface window displayed when the storing area 320 illustrated in FIG. 4 is selected.

Referring to FIG. 5, the user interface window 400 may include an area 410 to receive an input of a name to be registered for the favorite printing option selected by a user, an area 420 to receive an input of descriptions for the corresponding favorite printing option, a confirm area 430 to receive a confirmation of the setting, and an area 440 to cancel the registration.

For example, referring to FIGS. 2 and 3, a processing method for the printing option selected before the corresponding favorite printing option is selected may be established when the favorite printing option is registered, as described above. In order to receive such a setting, the user interface window 400 may additionally include an area 450, as illustrated in FIG. 6, to receive a selection of a method.

Thus, when a user selects the confirm area 430 after selecting a method through the area 450, features of the processing method for the corresponding favorite printing option may be stored together. Therefore, when the corresponding favorite printing option is selected when the printing option is selected, a method for application of the preselected printing option may be automatically determined according to the set features of the corresponding favorite printing option.

FIGS. 7 to 10 are views that illustrate examples of the second area 300 illustrated in FIG. 4.

Figure 7:
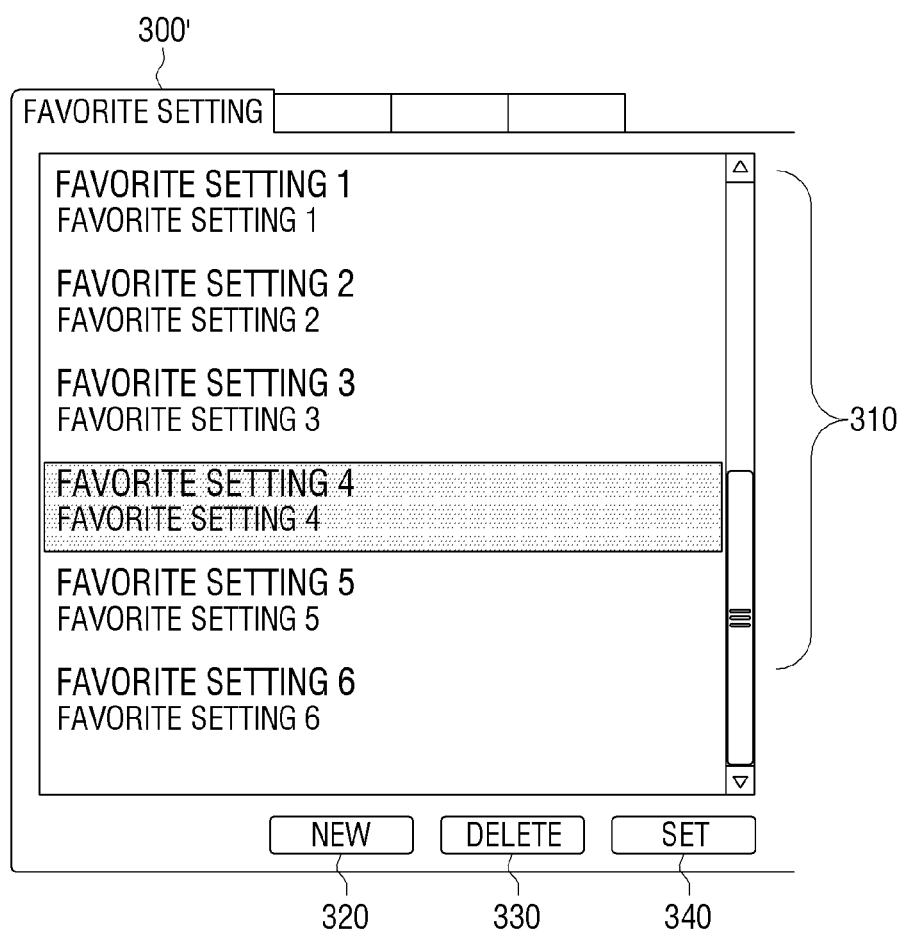

Referring to FIG. 7, the second area 300' may include the area 310 to display the favorite printing options frequently used by a user, the area 320 to establish a new favorite printing option, the area 330 to delete the preset favorite printing option, and an area 340 to modify a setting of the preset favorite printing option.

A user may select one among a plurality of favorite printing options displayed on the list area 310. When a user selects a favorite printing option, the corresponding printing option to the selected favorite printing option may be selected in the first area 210.

Figure 8:
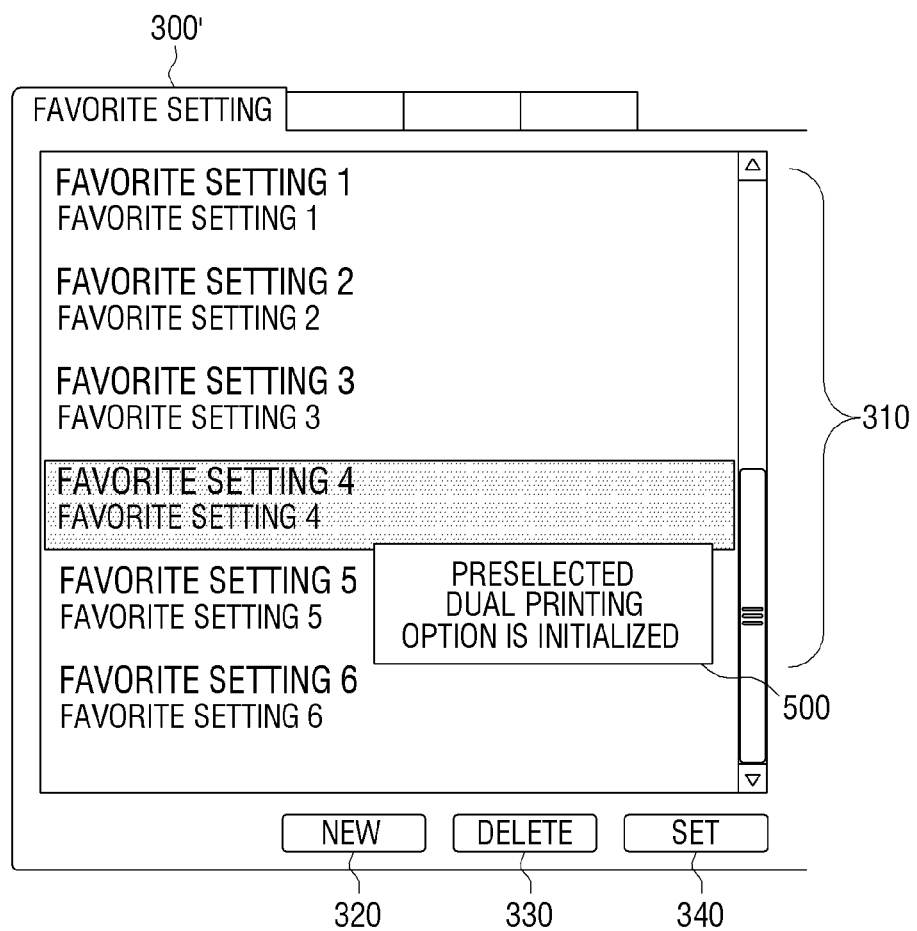
Figure 9:
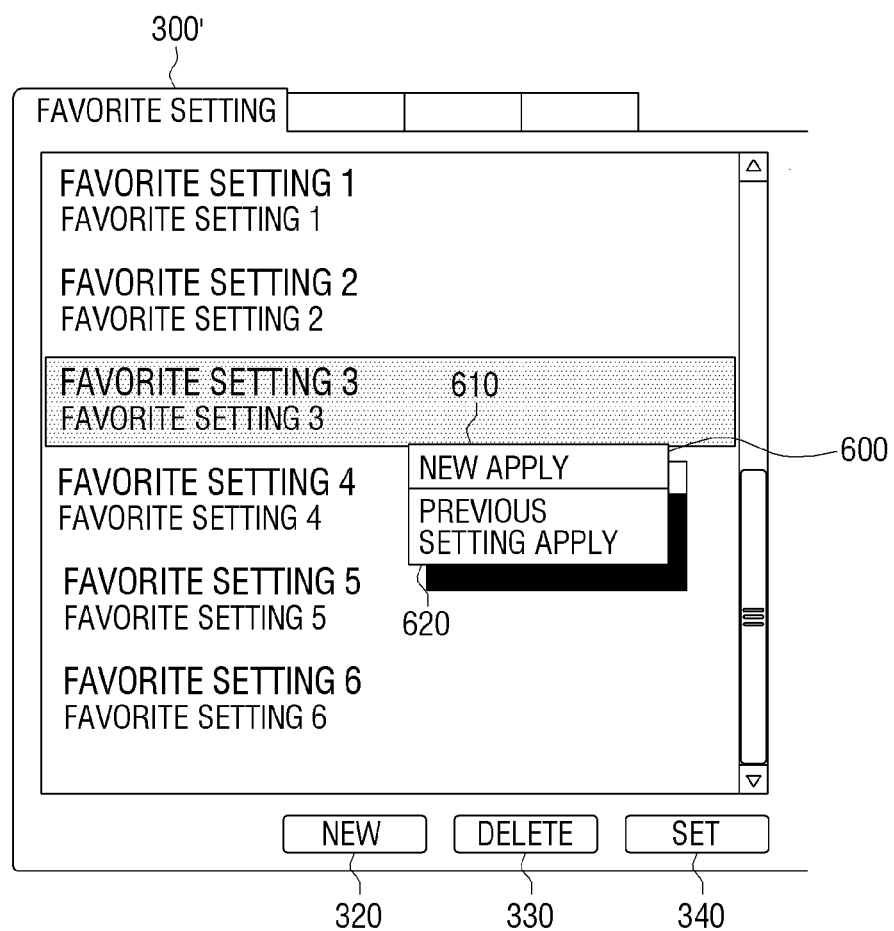

For example, when it is recorded that a user preselects the printing option before selecting the favorite printing option, the user interface window illustrated in FIG. 8 may be displayed or the user interface window illustrated in FIG. 9 may be displayed.

For example, when the printing option preselected by a user cannot be simultaneously set with the currently selected favorite printing option, or when the setting of the favorite printing option establishes that a previously set printing option is ignored, a message may be displayed at an area 500, as illustrated in FIG. 8, to inform a user that the preselected printing option is initialized.

For example, when the printing option preselected by a user may be simultaneously set with the a currently selected favorite printing option, or when the setting of the favorite printing option does not establish that a previously set printing option is ignored, processing methods 610, 620 that may process the preselected printing option may be displayed to a user at an area 600, as illustrated in FIG. 9, and the user interface 120 may receive a selection of one of them.

Herein, when a user selects a first processing method 610 (e.g., "New Apply"), the preselected printing option may be initialized, and the selected favorite printing option may only be established.

In this case, when a user selects a second processing method 620 (e.g., "Previous Setting Apply"), the preselected printing option and the favorite printing option may be simultaneously set.

Figure 10:
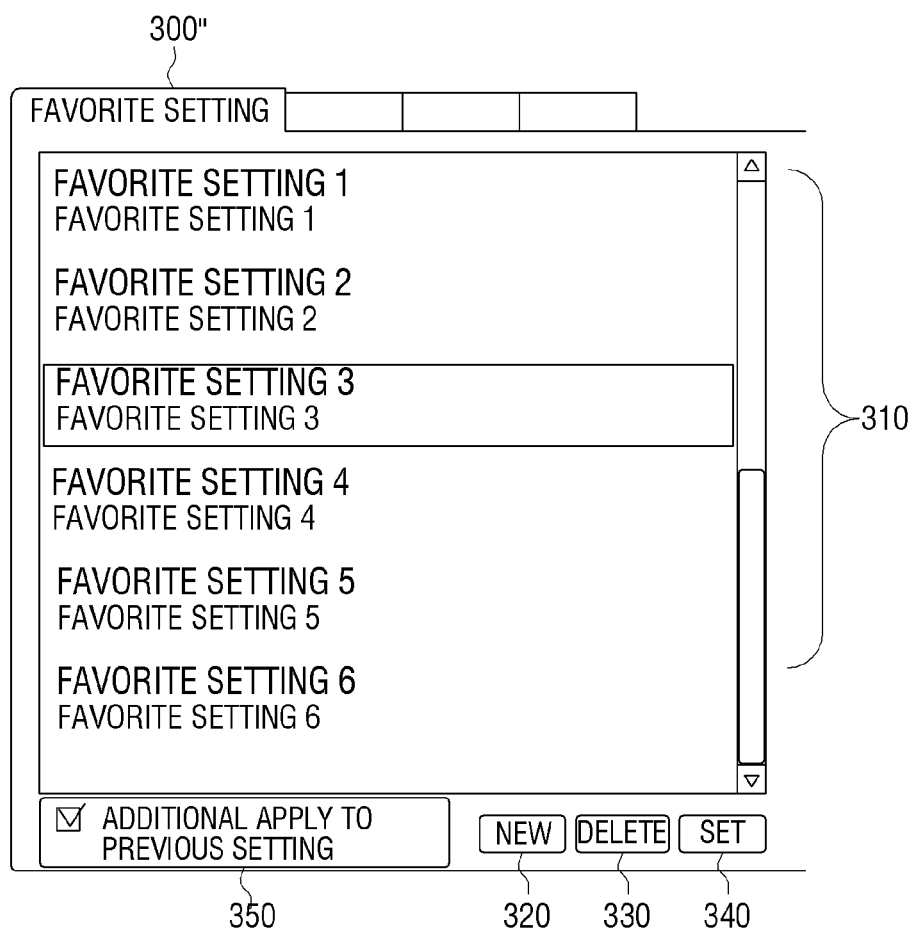

Although the explanation above illustrates and describes that a method in which a preselected printing option may be selected by a user after the favorite printing option is selected, alternatively, after the method in which the preselected printing option is selected by a user at an area 350, as illustrated in FIG. 10, the favorite printing option may be selected.

Figure 11:
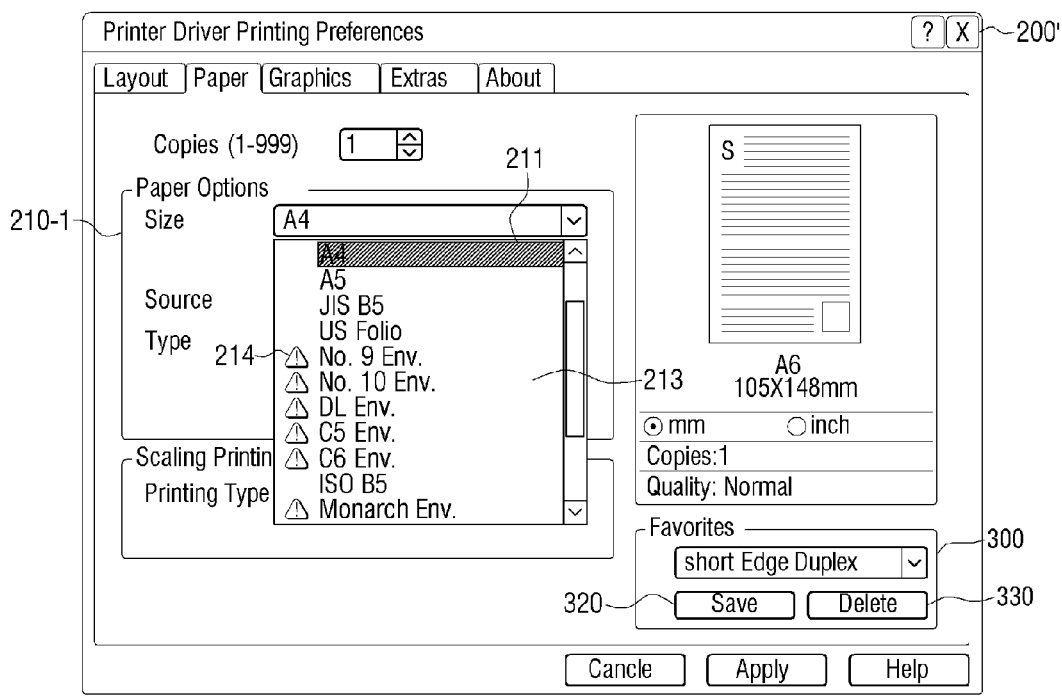

FIG. 11 is a view that illustrates an example of the user interface window that may be displayed after the favorite printing option is selected. It is assumed in the view illustrated in FIG. 11 that "book type" has been previously selected as the favorite printing option. In the paper size option of the conventional image forming apparatuses, envelope sizes such as, for example, "No. 9 Env." or others correspond to a printing option that cannot be simultaneously set with the "book format" printing type. However, if a user does not recognize this situation, he may try to select both of the above two options. In contrast, in an embodiment of the present inventive concept, after the "book format" printing option is selected, the user may, at an area 210-1, select the paper size option by selecting a paper tab in order to pick the envelope size. In response to a user selecting the paper size option, the printer may display in, for example, a list format, types of the paper sizes that may be supported. In this example, A4 paper 211 may not be displayed with a separate icon because the A4 paper 211 may not be set when the "book format" printing may be performed. Alternatively, regarding, for example, No. 10 envelope size 213, an icon 214 such as, for example, an exclamation point inscribed in a triangle may be displayed next to the list because the No. 10 envelope size option may not be supported by "book format" printing.

Figure 12:
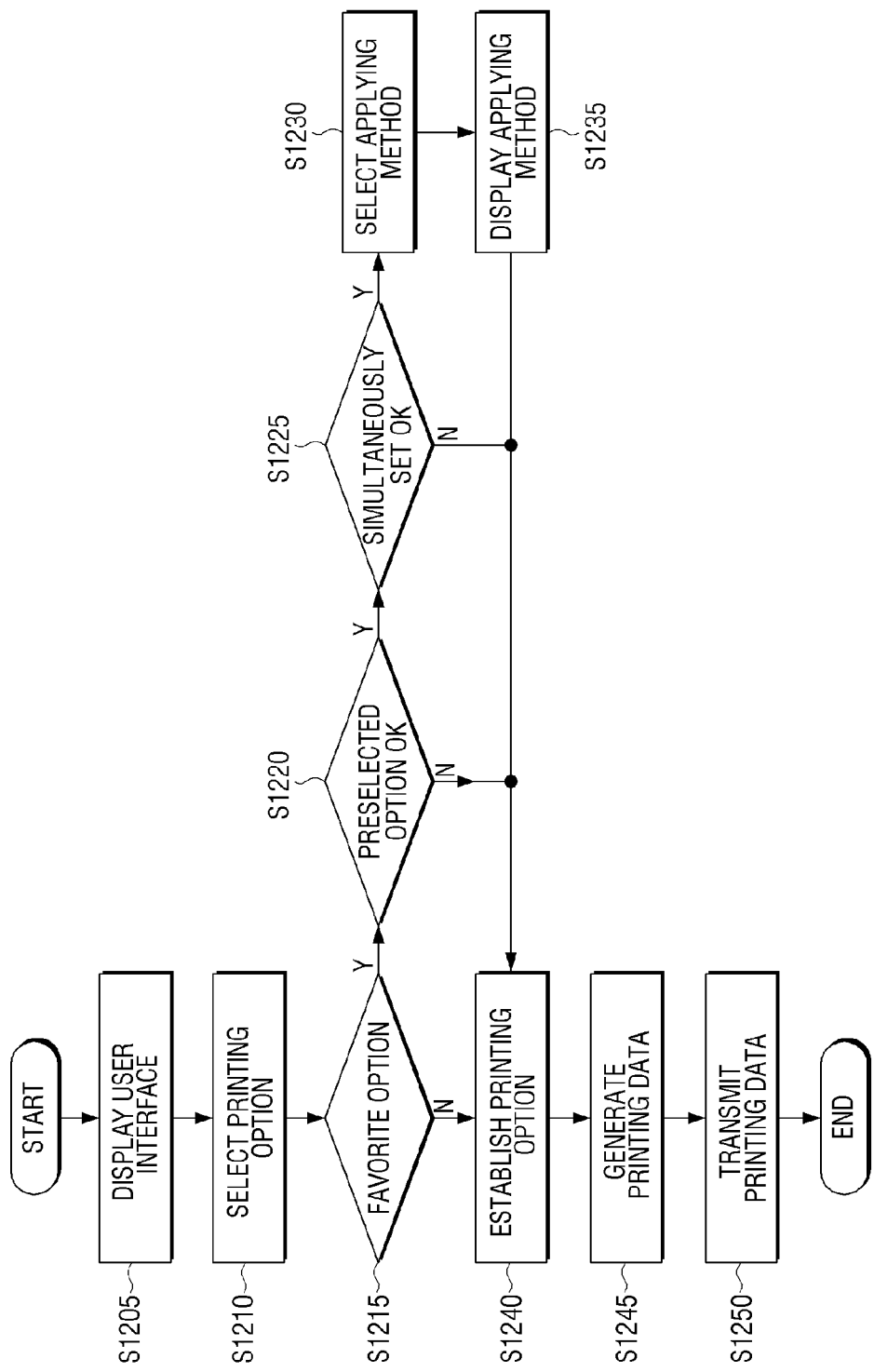
FIG. 12 is a flowchart that illustrates a printing control method according to an embodiment of the present inventive concept.

FIG. 12 is a flowchart that illustrates a printing control method according to an embodiment of the present inventive concept.

Referring to FIG. 12, at an operation S1205, the method may display the user interface window to receive a selection of the printing option that corresponds to a printing command of a user. For example, the user interface window may include the first area to receive a selection of the printing option, the second area to receive a selection of the favorite printing option, and additionally include the third area to receive a selection of a method for application of the preselected printing option before the favorite printing option is selected.

Through the displayed user interface window, at an operation S1210, the printing option to be applied to a document may be selected. For example, the printing option and the favorite printing option may be selected by a user. Such selections may be for a plurality of printing options.

At an operation S1215-Y, when a user selects the favorite printing option, the printing control method may determine, at an operation S1220, whether the printing option has been previously selected before the favorite printing option is selected.

As a result of a determination, when, at an operation S1215-N, the favorite printing option is not selected by a user, or when, at an operation S1220-N, the printing option is not selected before the favorite printing option is selected, the printing control method may establish, at an operation S1240, the selected printing option or the favorite printing option as the printing option to be applied to a document.

As a result of a determination, when, at an operation S1220-Y, there a is preselected printing option before the favorite printing option is selected, the printing control method may determine, at an operation S1225, whether the favorite printing option and the preselected printing option may be simultaneously set.

As a result of a determination, when, at an operation S1225-N, the favorite printing option and the preselected printing option cannot be simultaneously set, the preselected printing option may be initialized, and only the favorite printing option may be set as the printing option to be applied to a document. Additionally, for example, an indication may appear that the preselected printing option is undone because the favorite printing option and the preselected printing option cannot be simultaneously set.

However, when, at an operation S1225-Y, the printing option can be simultaneously set, the printing control method may select, at an operation S1230, a method for application of the preselected printing option. Such a selection may be performed by a user, and may be determined according to the printing option established as the favorite printing option or the printing option established on the third area of the user interface window. Section of various methods for application of printing options is described below with reference to FIGS. 13 to 16.

At an operation S1235, the selected method may be displayed. For example, when the method for application of the preselected printing option is selected to be initialized, an indication may be displayed that the preselected printing option is undone.

When selection of the printing option is completed according to the above processes, the currently selected printing option may be established as the printing option to be applied to a document, and, at an operation S1245, printing data may be generated according to the established printing option. Furthermore, at an operation S1250, the printing job may be completed by transmitting the generated printing data to the image forming apparatus.

The printing control method according to the above embodiment of the present inventive concept may display the method for application of the selected printing option before the favorite printing option is selected or may receive a selection of a method from a user, when the favorite printing option is selected after the printing option is selected. Thus, a user may set the printing option as he intends. The printing control method illustrated in FIG. 12 may be implemented in the printing control apparatus 100 that incorporates the features illustrated in FIG. 1 or in printing control apparatuses that have other features.

Furthermore, the printing control method described above may be implemented in computer programs (e.g., applications or printer drivers) that include algorithms that may run on a computer, and the programs may be stored and provided in computer-readable codes on a computer-readable medium. The computer-readable medium can include a non-transitory computer-readable recording medium and a computer-readable transmission medium.

Non-transitory computer-readable recording medium is any data storage device that can store data as a program which can be thereafter read by a computer system and include medium that store data semi-permanently and can be read by devices, not medium that store data temporarily such as a register, a cache, or a memory. Examples of the computer-readable recording medium include a hard disk, a read-only memory (ROM), random-access memory (RAM), compact discs (CDs), CD-ROMs, magnetic tapes, floppy disks, Universal Serial Bus (USB) memory devices, and optical data storage devices such as digital video disks (DVDs) and Blu-ray Discs. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Figure 13:
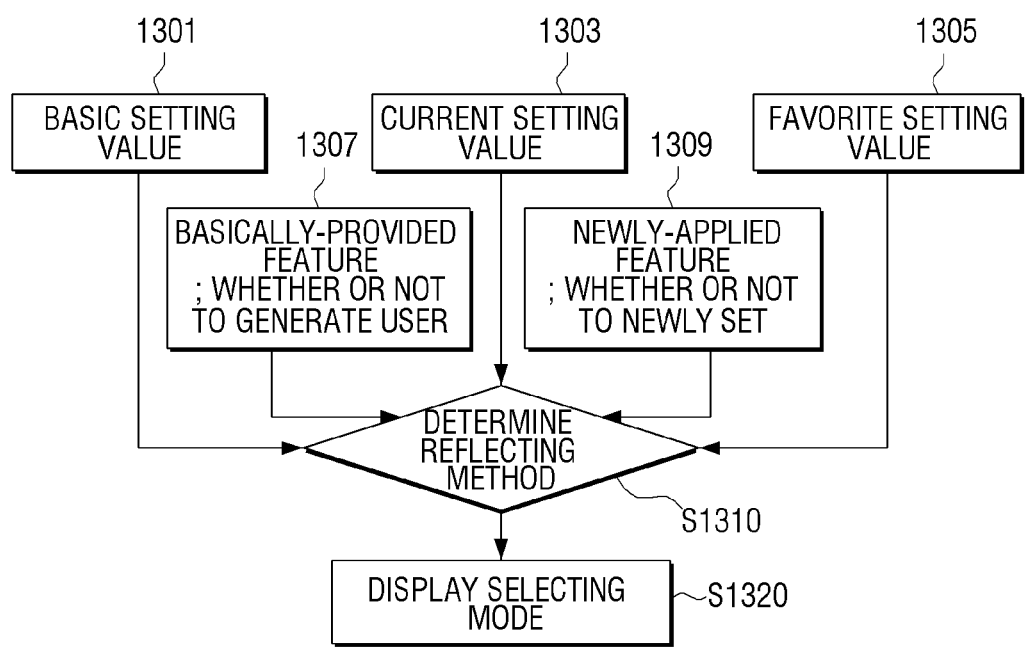
FIG. 13 is a flowchart that illustrates a process to select a method for application of a printing option according to a first embodiment illustrated in FIG. 12.

FIG. 13 is a flowchart that illustrates a process to select a method for application of a printing option according to a first embodiment illustrated in FIG. 12. Specifically, the method of selection according to the first embodiment is to use feature values established in the favorite printing option.

For example, at an operation S1310, the printer driver may determine whether it is necessary to first determine a method for application of a printing option by using the basic setting values 1301 for the current image forming apparatus, the setting values 1303 currently established on the user interface window, and the option values 1305 of the selected favorite printing option. For example, the basic setting values may be uniform with the currently established setting values. This case may happen when a user does not select another printing option before the favorite printing option is selected. In this case, it may be unnecessary to determine a method for application of the preselected printing option.

When there is preselected printing option, a method for application of a printing option may be determined by using the favorite printing option, generated by a user, and features about the method for application of the printing option established with the favorite printing option. A method of establishing features when the favorite printing option is stored is described below with reference to FIG. 17.

When there are no features for the method for application of the favorite printing option, it may be determined, at an operation S1320, that a user selection is necessary. An operation to determine a method by a selection of a user is described below with reference to FIG. 14.

Figure 14:
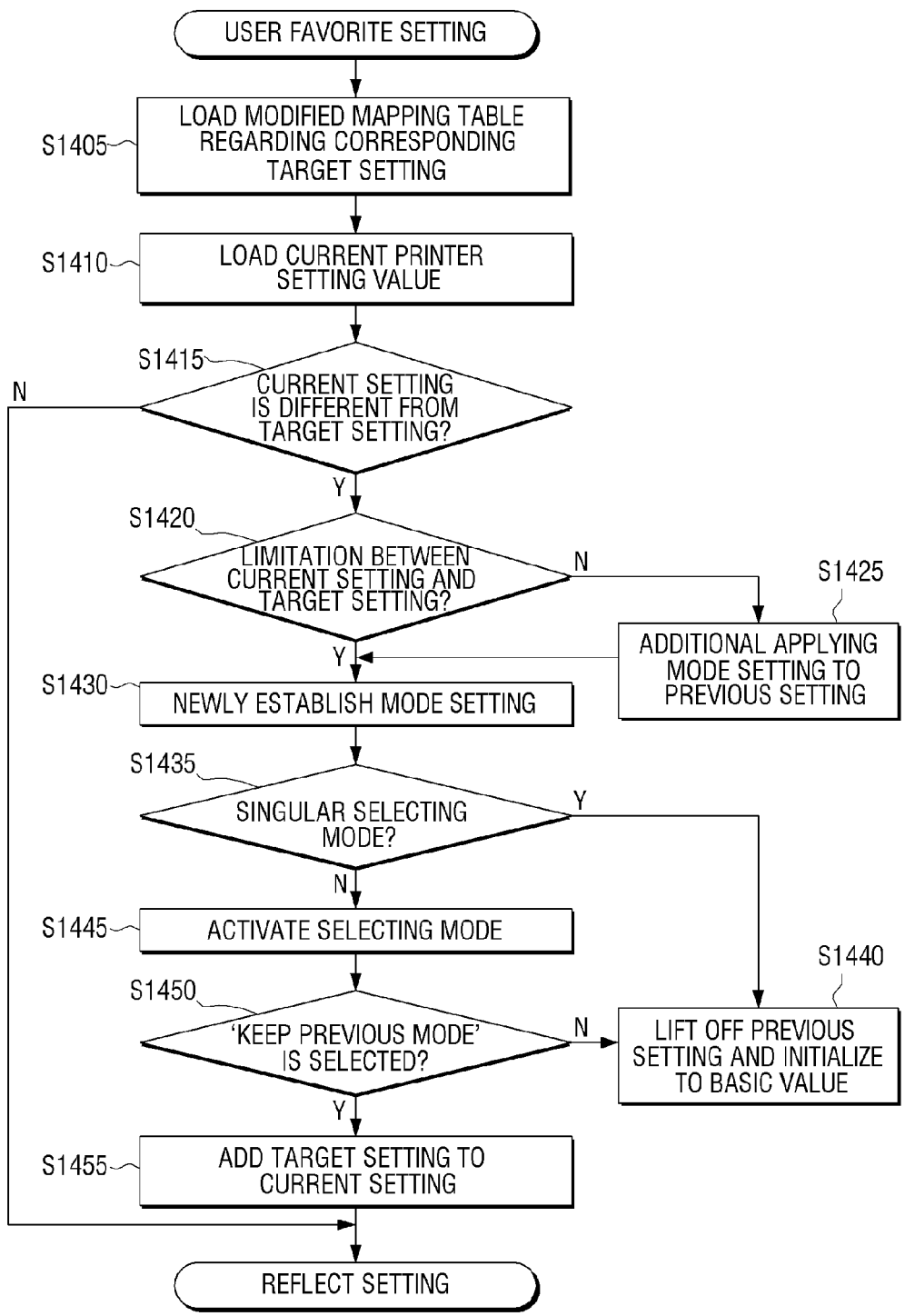
FIG. 14 is a flowchart that illustrates a process to select a method for application of a printing option according to a second embodiment illustrated in FIG. 12.

FIG. 14 is a flowchart that illustrates a process to select a method for application of a printing option according to a second embodiment illustrated in FIG. 12. Specifically, the method of selection according to the second embodiment is to use a selection of a user.

Referring to FIG. 14, when the favorite printing option is selected, the printing option established as the favorite printing option may be confirmed, at an operation S1405, by loading a mapping table established on the favorite printing option.

At an operation S1410, the setting values currently selected by a user may be read, and it may be determined, at an operation S1415, whether there is a preselected printing option before the favorite printing option is selected.

At an operation S1415-N, when there is no preselected printing option, determining a method for application of a printing option may not be performed.

At an operation S1415-Y, when there is a preselected printing option, it may be determined, at an operation S1420, whether there is a limitation in the current setting and the target setting. For example, whether the preselected printing option and the favorite printing option may be simultaneously set may be determined.

As a result of a determination, when, at an operation S1420-N, there is no limitation, i.e., when the preselected printing option and the favorite printing option may be simultaneously set, the selection mode may be established, at an operation S1425, as plural.

In contrast, when, at an operation S1420-Y, there is a limitation, i.e., when the preselected printing option and the favorite printing option cannot be simultaneously set, at an operation S1430, the selection mode may not be separately established. Thus, it may be established as single selection mode.

At an operation S1435, it may be determined whether or not the selection mode is established to be plural. When, at an operation S1435-Y, the selection mode is established to be single, at an operation S1440, the preselecting printing option may be initialized.

For example, when, at an operation S1435-N, the selection mode is established to be plural, the user interface window may be displayed, at an operation S1445, to receive a selection of one of the plural selection modes.

When, at an operation S1450-N, the mode that does not apply the preselected printing option is selected on the displayed user interface window at 1450-N, at the operation S1440, the preselected printing option may be initialized.

For example, when, at an operation S1450-Y, the mode that does apply the preselected printing option is selected on the displayed user interface window, the selected favorite printing option may be additionally established, at an operation S1455, while the preselected printing option is established.

Figure 15:
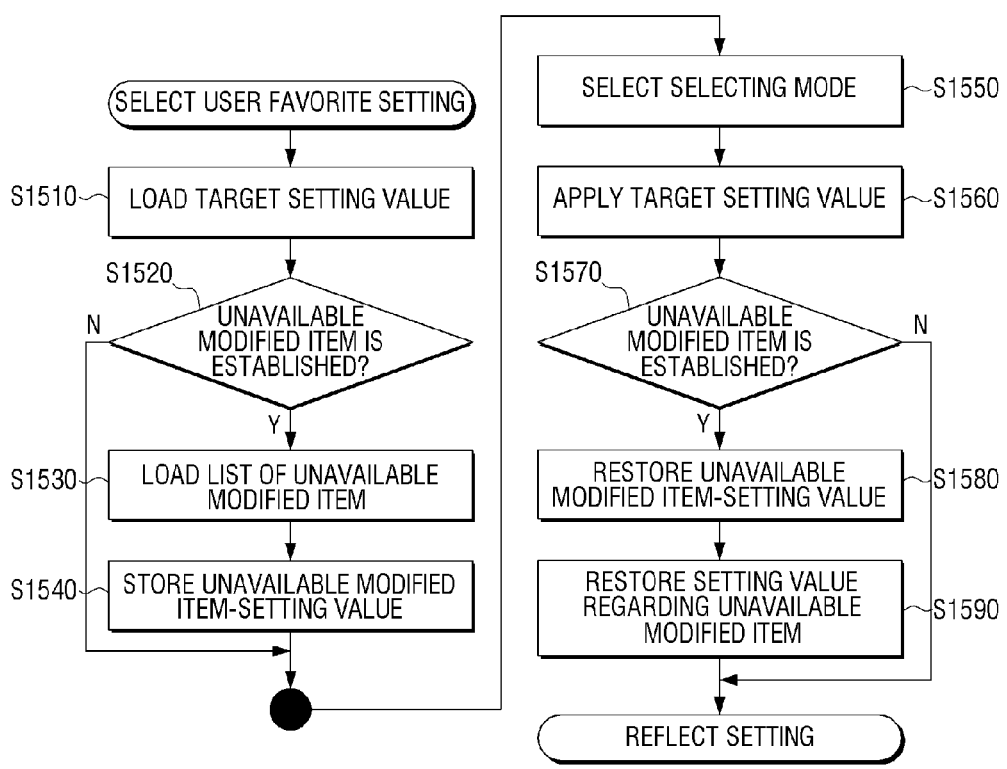
FIG. 15 is a flowchart that illustrates a process to select a method for application of a printing option according to a third embodiment illustrated in FIG. 12.

FIG. 15 is a flowchart that illustrates a process to select a method for application of a printing option according to a third embodiment illustrated in FIG. 12. Specifically, the method of selection according to the third embodiment is to use an unavailable modifying item. For example, the unavailable modifying item is a setting method used when a user wants to keep a specific setting when modifying the setting by using the favorite setting.

Referring to FIG. 15, the method to establish the unavailable modifying item is first described. For example, when the favorite printing option is selected, the mapping table established for the favorite printing option may loaded, at an operation S1510, and the printing option established as the favorite printing option may be confirmed. At an operation S1520, it may be determined whether the unavailable modifying item is established for the favorite printing option.

As a result of a determination, when, at an operation S1520-Y, the unavailable modifying item is established, a list for the unavailable modifying item may be loaded at an operation S1530, and setting values for the corresponding unavailable modifying item may be stored, at an operation S1540, among the previous setting values.

After the values are set as described above, when the selected favorite setting is reflected by being added to the previous setting, at an operation S1550, or by being newly applied, at an operation S1560, and when the unavailable item is established at an operation S1570 (i.e., when the setting values are stored at the operation S1540), the setting values stored during the previous processes may be restored, at an operation S1580, as a top priority, and the other setting values may be additionally reflected, at an operation S1590, according to the setting mode among the settings that are not overlapped. If user information about a job needs to be kept, the corresponding setting may be designated as the unavailable modifying item. Thus, the user information about the job may be kept even if the previous setting is undone due to the favorite setting and the new setting values being applied.

Figure 16:
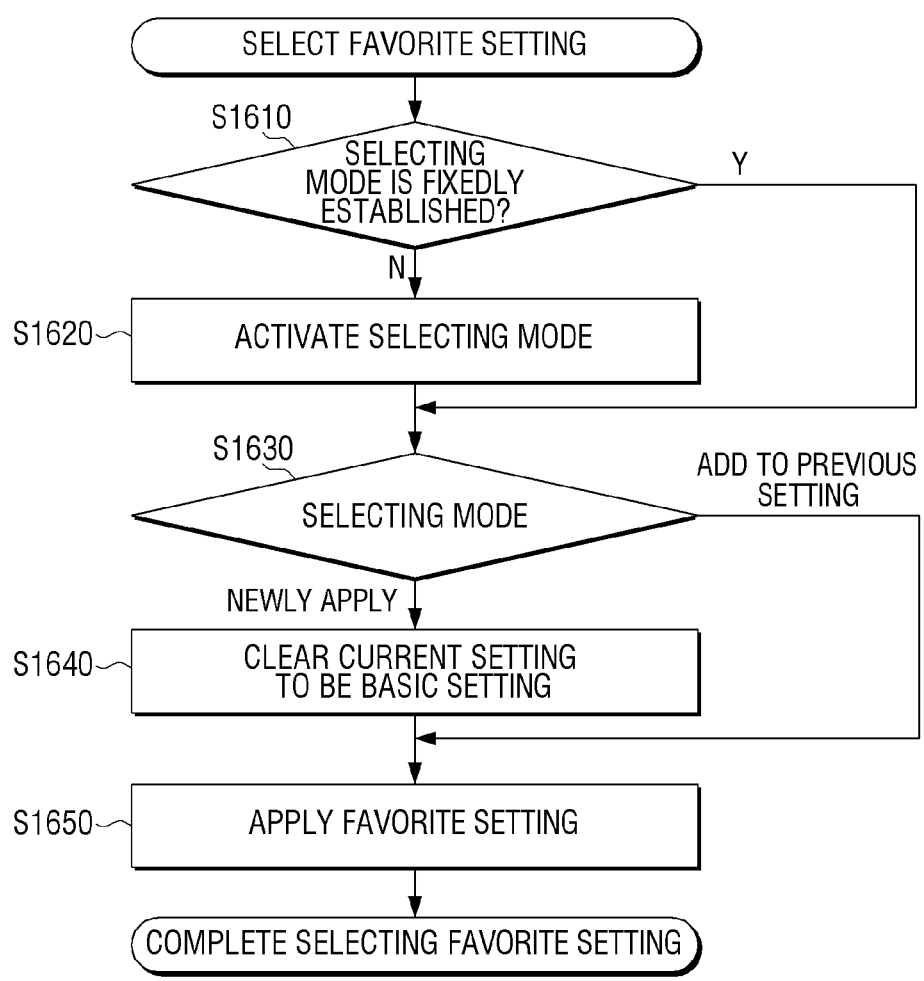
FIG. 16 is a flowchart that illustrates a process to select a method for application of a printing option according to a fourth embodiment illustrated in FIG. 12.

FIG. 16 is a flowchart that illustrates a process to select a method according to a fourth embodiment illustrated in FIG. 12. Specifically, the fourth embodiment is a method to select a method for application of a printing option through the third area of the user interface window.

First, at an operation S1610, the selection mode may be determined to be fixed. Specifically, selection by a user through the third area 350 as illustrated in FIG. 10 may be performed.

As a result of a determination, when, at an operation S1610-Y, a selection through the third area is performed, another action may not be made. In contrast, when, at an operation S1610-N, selection through the third area is not performed, the selection mode may be activated at an operation S1620. For example, the fourth embodiment relates to a format in which another action may not be made when a selection through the third area is performed. Alternatively, when a selection through the third area is performed, the selection mode may be inactivated.

Next, setting the method for application of the printing option may be performed. Specifically, when, at an operation S1630, the selection through the third area is added to the previous setting, the favorite printing option selected when the preselected printing option is set may be additionally established at an operation S1650.

In contrast, when, at the operation S1630, the selection through the third area is newly applied, on the selection through the third area may be to initialize, the preselected printing option may be initialized at an operation S1640.

Figure 17:
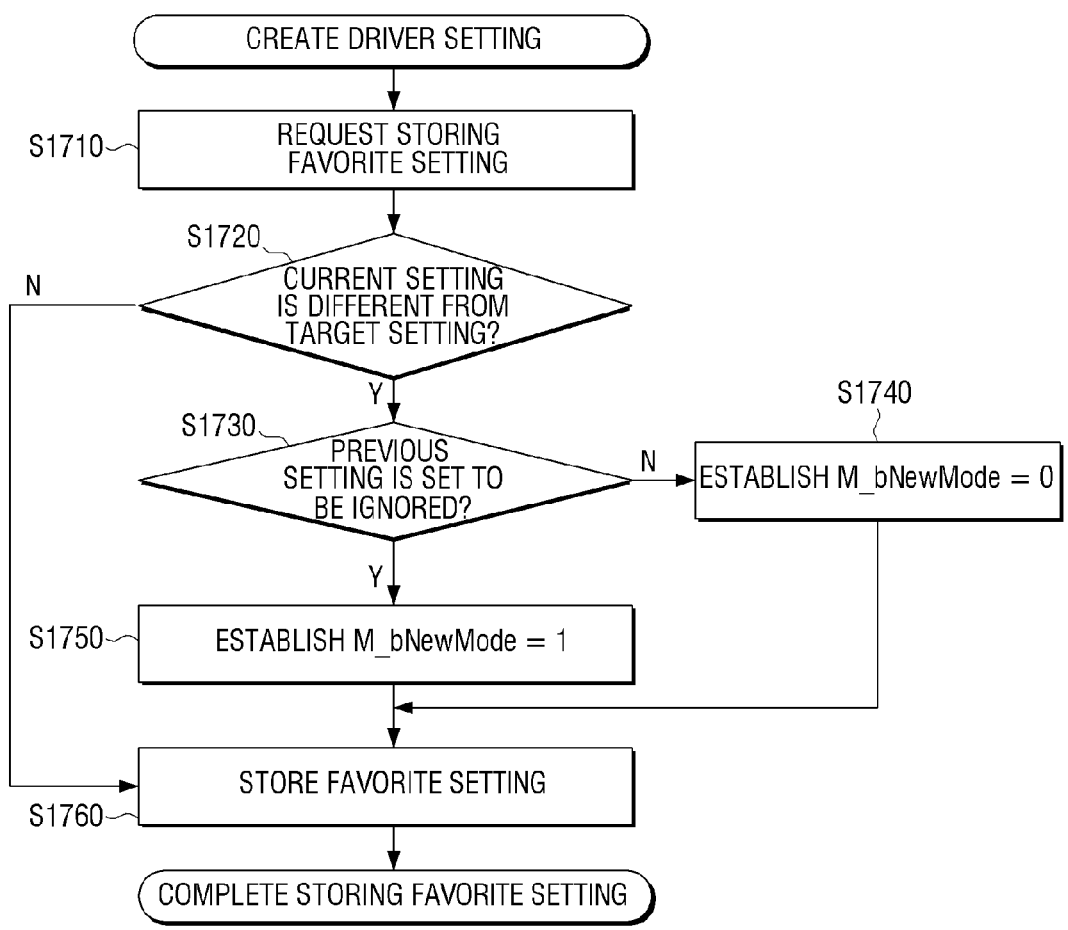
FIG. 17 is a flowchart that illustrates a method of setting features for the method for application of the favorite printing option according to an embodiment of the present inventive concept.

FIG. 17 is a flowchart that illustrates a method of setting features for the method for application of the favorite printing option according to an embodiment of the present inventive concept.

Referring to FIG. 17, at an operation S1710, at least one printing option may be selected, and a request to store the selected printing option as a favorite printing option may be inputted.

When the request to store is inputted, it may be determined, at an operation 1720, whether the current setting is uniform with the setting of the previous favorite printing option. If the current setting is different from the previous favorite printing option, it may be determined, at an operation S1730, whether features for the method for application of the preselected printing option are established.

If the features are established, the values for the established features may be added and stored, at an operation S1760, with information about the favorite printing option. For example, when, at an operation S1730-N, a user selects a method to reflect the previous setting, "M-bnewMode", for example, may be established to be zero at an operation S1740, and may be stored, at an operation S1760, as a feature value for the method. In contrast, when, at an operation S1730-Y, a user selects a method not to reflect the previous setting, "M-bnewMode", for example, may be established to be on at an operation S1750 and may be stored, at the operation S1760, as a feature value for the method Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printing control method of a printing control apparatus configured to connect to an image forming apparatus, comprising:
   receiving, at the printing control apparatus, a selection of a printing option to be applied to a document;
   in response to a favorite printing option being the selection of the printing option:
      determining at least one difference value between basic setting values of the image forming apparatus and setting values of the favorite printing option which include at least one modified value of the basic setting values,
      storing the favorite printing option by storing only the at least one difference value in a storage, and
      displaying, at the printing control apparatus, information about a method for a preselected printing option;
   establishing, at the printing control apparatus, the printing option to be applied to the document according to the displayed information about the method; and
   generating, at the printing control apparatus, printing data according to the established printing option and transmitting the printing data to the image forming apparatus,
   wherein, if the preselected printing option cannot be set with the favorite printing option because the image forming apparatus is incompatible with the favorite printing option, displaying the information about the method for the preselected printing option includes displaying an indication that the preselected printing option cannot be set with the favorite printing option.

2. The printing control method of claim 1, further comprising:
   selecting, at the printing control apparatus, the method for the preselected printing option.

3. The printing control method of claim 2, wherein the selecting the method selects whether to keep or to undo a setting of the preselected printing option.

4. The printing control method of claim 3, wherein the preselected printing option is a plurality of preselected printing options and the selecting the method selects whether to keep or to undo the setting of each of the preselected printing options.

5. The printing control method of claim 2, further comprising:
 determining, at the printing control apparatus, an existence of a capability to set the preselected printing option and the favorite printing option together,
 wherein, in response to the existence of the capability, the selecting the method comprises receiving a selection of the method for the preselected printing option through a user interface window.

6. The printing control method of claim 5, further comprising:
 in response to a lack of the existence of the capability, displaying, at the printing control apparatus, information that the preselected printing option is not set.

7. The printing control method of claim 1, wherein the receiving the selection of the printing option comprises receiving the selection of the printing option through a user interface window which includes a first area configured to receive a selection of the preselected printing option and a second area configured to receive a selection of the favorite printing option.

8. The printing control method of claim 7, wherein the user interface window includes a third area configured to receive a selection of the method for the preselected printing option.

9. The printing control method of claim 1, further comprising:
 storing, at the printing control apparatus, the established printing option as the favorite printing option.

10. A printing control apparatus connectable to an image forming apparatus, comprising:
 a storage;
 a display to display a plurality of printing options to be applied to a document; and
 a controller:
  to control the display to display, in response to receiving a selection of a printing option among the plurality of printing options and to a favorite printing option being the selection of the printing option among the plurality of printing options, information about a method for a preselected printing option;
  to determine, in response to receiving the selection of the printing option among the plurality of printing options and to the favorite printing option being the selection of the printing option among the plurality of printing options, at least one difference value between basic setting values of the image forming apparatus and setting values of the favorite printing option which include at least one modified value of the basic setting values;
  to store in the storage, in response to receiving the selection of the printing option among the plurality of printing options and to the favorite printing option being the selection of the printing option among the plurality of printing options, only the at least one difference value;
  to establish the printing option to be applied to the document according to the information about the method, and to generate printing data according to the established printing option, and
  to transmit the printing data to the image forming apparatus,
 wherein, if the preselected printing option cannot be set with the favorite printing option because the image forming apparatus is incompatible with the favorite printing option, the information about the method for the preselected printing option displayed by the display includes an indication that the preselected printing option cannot be set with the favorite printing option.

11. The printing control apparatus of claim 10, wherein the controller selects the method of the preselected printing option.

12. The printing control apparatus of claim 11, wherein a selection of the method determines whether to keep or to undo a setting of the preselected printing option.

13. The printing control apparatus of claim 12, wherein the preselected printing option is a plurality of preselected printing options and the selection of the method determines whether to keep or to undo the setting of each of the preselected printing options.

14. The printing control apparatus of claim 13, wherein the display displays, in response to a lack of the existence of the capability, information that the preselected printing option is not set.

15. The printing control apparatus of claim 11, wherein
 the controller determines an existence of a capability to set the preselected printing option and the favorite printing option together, and
 in response to the existence of the capability, the controller establishes the printer option to be applied to the document according to a selection of the method for the preselected printing option.

16. The printing control apparatus of claim 10,
 wherein the storage stores the established printing option as the favorite printing option.

17. The printing control apparatus of claim 16, wherein the storage is configured to store, in response to the favorite printing option being the selection of the printing option, the information about the method for the preselected printing option together with information about the favorite printing option.

18. A non-transitory computer-readable recording medium comprising programs to implement a printing control method, the printing control method comprising:
 receiving, at a controller, a selection of a printing option to be applied to a document;
 displaying, under a control of the controller, in response to a favorite printing option being the selection of the printing option, information about a method for a preselected printing option;
 determining, in response to the favorite printing option being the selection of the printing option, at least one difference value between basic setting values of the image forming apparatus and setting values of the favorite printing option which include at least one modified value of the basic setting values;
 storing the favorite printing option by storing only the at least one difference value in a storage;
 establishing, at the controller, the printing option to be applied to the document according to the displayed information about the method; and
 generating, at the controller, printing data according to the established printing option,
 wherein, if the preselected printing option cannot be set with the favorite printing option because the image forming apparatus is incompatible with the favorite printing option, the displaying includes displaying an indication that the preselected printing option cannot be set with the favorite printing option.

\* \* \* \* \*